United States Patent [19]

Grund et al.

[11] Patent Number: 5,723,197

[45] Date of Patent: Mar. 3, 1998

[54] MOUNTING DEVICE FOR FOAMING IN A FOAM PART

[75] Inventors: Wolfgang Grund, Minden; Horst Steinmeier, Lübbecke; Matthias Habersatter, Mallersdorf-Pfaffenberg, all of Germany

[73] Assignee: Johnson Controls GmbH & Co. KG, Espelkamp, Germany

[21] Appl. No.: 576,101

[22] Filed: Dec. 21, 1995

[30] Foreign Application Priority Data

Dec. 23, 1994 [DE] Germany ............. 44 46 450.9

[51] Int. Cl.⁶ ................................................. B32B 5/18
[52] U.S. Cl. ............... 428/122; 297/452.6; 428/159; 428/358
[58] Field of Search ................... 428/122, 358, 428/159; 297/452.18, 452.6

[56] References Cited

U.S. PATENT DOCUMENTS

| | | | |
|---|---|---|---|
| 3,624,964 | 12/1971 | Bordner et al. | 428/122 X |
| 4,197,342 | 4/1980 | Bethe | 428/159 |
| 4,343,845 | 8/1982 | Burden et al. | 428/122 |
| 4,585,273 | 4/1986 | Higgs et al. | 297/452.18 |
| 4,849,277 | 7/1989 | Jaklofsky | 428/159 X |
| 4,957,796 | 9/1990 | Pelzer | 428/122 X |
| 5,009,947 | 4/1991 | McManus et al. | 428/122 |

*Primary Examiner*—Henry F. Epstein
*Attorney, Agent, or Firm*—Harness, Dickey & Pierce, P.L.C.

[57] ABSTRACT

This invention deals with a particular mounting device—and its production—for foaming in a foam part made of polyurethane or similar material and serving as a pad for backrests, seating surfaces, and respective areas of car seats. The mounting device allows attachment of a cover onto the foam part. This invention dispenses with the use of metal inlaid wires in the foam part and uses an easily-produced foam part. The mounting device has a girder section with preferably a coarse meshwork which is at least partially foamed around by polyurethane or similar material before being placed into a mold for the foam part.

5 Claims, 2 Drawing Sheets

MOUNTING DEVICE FOR FOAMING IN A FOAM PART

BACKGROUND AND SUMMARY OF THE INVENTION

This invention deals with a particular mounting device—and its production—for foaming into a foam part made of polyurethane or similar material for use as a pad for backrests, seating surfaces, and respective areas of car seats. The mounting device allows for attachment of a cover onto the foam part.

Polyurethane (PUR) foam parts are commonly used as pads for backrests, seating surfaces and similar surfaces in vehicle seats. The foam parts are then covered with a seat cover made of textile, leather or respective materials. In order to produce these foams parts, liquid polyurethane is injected into a mold which is then closed and heated. This process expands the polyurethane and gives the foam part the desired shape. So-called inlaid wires are foamed into the foam part to facilitate the attachment of a cover onto the foam part. Metal rings or the like mount similar wires in the cover to the wires in the foam part.

Prior to the insertion of the liquid polyurethane, the inlaid wires are laid into the mold. Magnets and locking pins keep the wires at the designated places within the mold, and prevent the wires from being displaced during the insertion and expansion of the polyurethane. The wires are completely embedded into the foam part. Only the arrest points keep some free spaces to give access to the wires and allow for the eventual fastening of the cover.

Manufacturing the metal wires is comparatively expensive as they have to be produced in different lengths and forms. An individual backrest may need up to seventeen different wires of various lengths and bends in order to avoid contact between adjacent wires. Contact would lead to undesired noises during related wire movements. Furthermore, the bends and angles are to keep the wires embedded in the foam part by producing acceptable pull-out forces.

In addition to their high production costs, the metal wires cause problems with the disposal of used foam parts. Since the foam parts with their inlaid wires are not completely pure, the wires have to be removed prior to the disposal of the foam parts. As of now, this removal has been done by hand. Only after this manual process can the purified foam parts be supplied to refuse dressing equipment and be recycled for the production of new foam parts. The removal of the metal wires is self-evident. Burning of the foam part has been the only alternative disposal so far.

The multitude of different wires which are required for the production of a single foam part poses a further problem. Standing at the assembly line, the worker involved in the production of such foam parts has little cycle time to operate with in placing the wires into the foam mold and ensuring that the needed wires have been provided. In addition, it is continuously necessary to adapt work methods and skills to the different car types as the arrangement and selection of the inlaid wires vary for each foam part.

If one considers that more than one hundred different inlaid wires are used with different car types and car producers, the respective requirements of those who insert the inlaid wires into the mold become evident. If the wires are incorrectly arranged, the entire foam part must be disposed as a reject because the wires may stick out of the foam part and because the regular attachment of the cover is no longer possible. Facing the multifarious disadvantages of these metal wires which are routinely foamed into such foam part, one has looked for alternatives which would dispose with the use of metal wires. Instead, plastic bars are inserted which, however, share the same disadvantages with the metal wires. Suggestions to attach the cover by means of severable fasteners to the foam part have also been made. However, this method does not achieve a permanent secure connection between the cover and foam part. In addition, the attachment of the fasteners to the foam part and the cover proves difficult and consequently costly.

It is the object of the invention, therefore, to make an easily producible and reliable connection between a foam part and a cover while eliminating the use of metal wires.

The invention achieves the above object with a mounting device having a girder section that is basically formed by a coarse meshwork and which is at least partly foamed around by polyurethane or the like. Such a mounting device can be inserted into the mold in ways similar to those used with the conventional inlaid wires, and it can be foamed around by polyurethane or the like. This method enables the production of a purified foam part which can later be comminuted or pulverized and recycled without any problem and without first removing the mounting device. Foamed around by polyurethane, the girder section of the mounting device owns a sufficient stiffness to procure an adequate hold for a cover attached to the foam part.

It is an advantage of the invention that the weight of the manufactured foam part is reduced since the comparatively heavy metal wires are no longer needed. Furthermore, since this method also precludes metal contact which has been responsible for undesired noises when the inlaid wires made contact with one another, complicated wire structures which helped to avoid such points of contact become obsolete. Hence, the production cost is decreased.

The manufacturer will find it easier to insert the mounting devices as only different lengths but no longer different forms have to be distinguished. This advantage helps reduce both the margins of error and the production of waste.

According to the preferred form of the invention, the girder section contains polyethylene, jute, gauze, fleece or similar material. This composition allows for not only a reliable connection to the polyurethane which is foamed around, but also a cheap production of the girder section.

The invention designs a U-shaped, circular, or rectangular sectional area for the girder section, but any other sectional area can equally be used.

In order to solidify the hold of the mounting device in the foam part, the invention plans to provide the girder section with at least one holding portion which should preferably extend laterally. Thus, the pull-out forces which are necessary for the separation of the mounting device from the foam part can be increased. In fact, the mounting device becomes virtually embedded in the foam part.

A further increase of the pull-out forces occurs, if at least one holding portion of the girder section is not foamed around by the polyurethane in the mounting device but rather extends from the polyurethane body of the mounting device. Only during the foaming expansion of the foam part does the extending holding portion become foamed. This results in the holding portion of the girder section being embedded directly into the foam of the foam part, producing a direct connection of the polyurethane of the foam part with the holding portion of the girder.

According to one form of the invention, the polyurethane foam which surrounds the girder section consists at least partially of recycled material. Compared to other appliances, the polyurethane foam can contain a higher amount of recycled material because issues of foam stability and elasticity of the mounting devices are no longer tantamount.

The invention plans to produce the mounting device, for example, by means of a heatable mold into which the girder section is continuously inserted and through which it is transported. Simultaneous to the insertion of the girder section, liquid polyurethane is brought into the mold and foamed through heat radiation. Polyurethane foam at least partially surrounds the girder section. The length of the mold can be adapted to the reaction time of the polyurethane foam.

In a variant of the invention, polyurethane is continuously extruded and warmed upon the girder section, so that the girder section at least partially warms up.

In order to reduce the production costs, the invention suggests to bring the girder section along with the surrounding polyurethane foam through idler pulleys or similar mechanisms into the intended shape before the polyurethane ages. This concept considerably facilitates the designing of both the die and the mixer head of the extrusion device.

The scheme of the invention permits some further developments: as the mounting devices are designed as a continuous strand which is wound onto a reel, it is possible to cut the strand to the individual desired lengths of the mounting devices.

Preferably, the mounting devices can be cut to lengths directly where the foam parts are produced. This process has the advantage to allow for the precise measuring of the respective lengths of the mounting part for each variant of the foam part produced. Foam part and mounting devices can be coproduced. Alternatively, a preprogrammed control system can determine the individual lengths, so that any costly storage of the different mounting devices becomes superfluous.

The invention further schedules a foam part—especially for the use as padding for backrests, seating surfaces or the like of vehicular seats—into which the above-described mounting devices can be foamed for the attachment of covers.

Within the production of the foam parts, the mounting devices are placed into clamps in the heatable mold. Liquid polyurethane or the like is filled into the form which is subsequently closed and heated, and the polyurethane begins to foam. The elasticity of the mounting devices allows for retention of the mounting device in the heatable mold while the particular arrangement of the clamps may provide for the insertion of any mounting device into the foam part. Thus, the conventional expensive holding devices with metal wires and magnets becomes superfluous which helps lower significantly the production costs of the mold. Concurrently, the new method guarantees a reliable stability of the mounting device within the clamps.

The subsequent description of the different performances or operations and the attached illustration display the range of further developments, advantages, and uses of this invention. By themselves or in any arbitrary combination, all written and/or graphically described features establish the object of the invention. These features are independent of summarized claims and inferences. Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
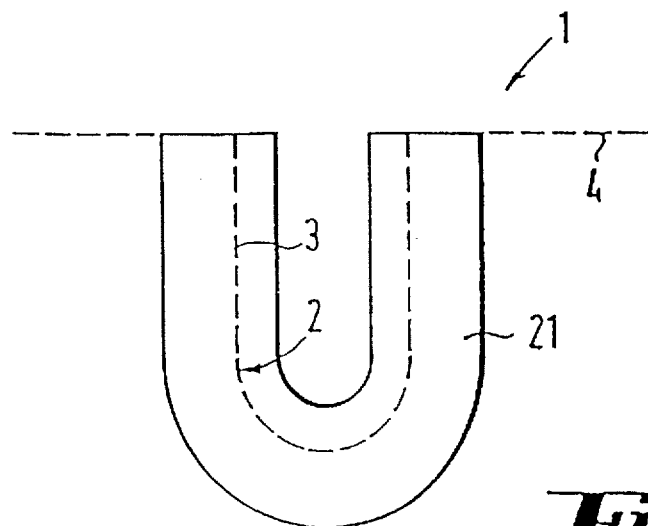
FIG. 1 is a sectional area of the mounting device of the present invention.

Depicted in FIG. 1, a mounting device 1 is shown which is to be foamed into a foam part. The mounting device 1 serves to attach a cover on a foam part used as a pad of a backrest or the like of vehicular seats. The mounting device 1 consists of a girder section or core 2 which is partially foamed around by a body 21 of foamed resin such as polyurethane (PUR) or similar material.

In the application of the mounting device depicted in FIG. 1, the girder section 2 is basically U-shaped having sides 3. The girder section 2 may include horizontal holding portions 4 which extend laterally outward from the sides 3 of the U-shaped object. The girder section consists of a coarse meshwork of polyethylene, jute, gauze, fleece, or similar material. As long as the foaming material completely soaks the meshwork and as long as the meshwork can be foamed without complications, the materials can freely be chosen. Besides the exemplarily depicted U-shape of the girder section 2, different shapes such as circular or rectangular crosscuts of the girder section are also possible. With all shapes, however, it is of prime importance to be able to soak and foam fully the girder section with the foam material.

Figure 2:
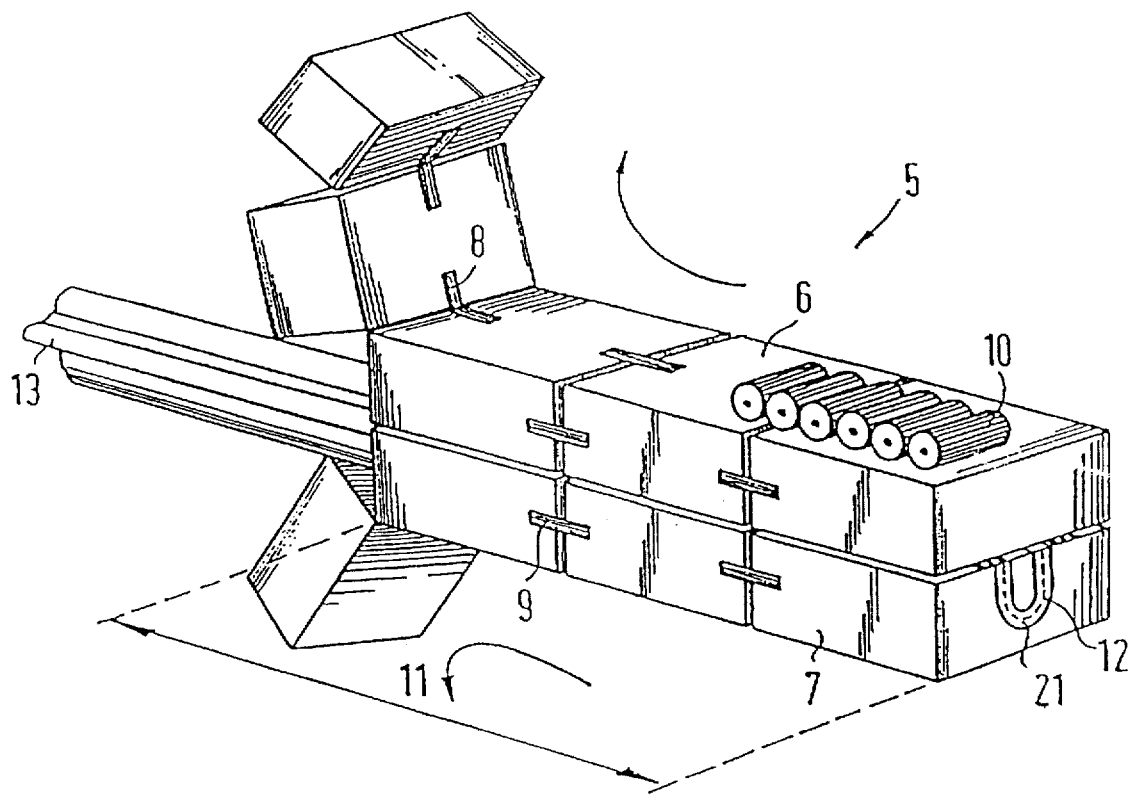
FIG. 2 is a schematic outline of a first method of producing the mounting device of the present invention.

FIG. 2 outlines the first model of the invention: a circulating mold 5 helps produce the mounting device 1. The circulating mold 5 consists of a multitude of upper-level segments 6 and lower-level segments 7. Articulations 8, 9 join the respective segments with the adjacent upper-level segments 6 and lower-level segments 7. Upper and lower level segments 6, 7 can be conveyed by a drive 10 which is only schematically outlined for the upper level. This drive carries along the girder section. As the arrows indicate, the individual segments 6, 7 follow a circular path. The model route 11 illustrates that the upper level segments 6 and the lower level segments 7 lie opposite each other and follow a parallel direction along the route 11 forming the circular mold. After having completed the model route 11, upper-level segments and lower-level segments 6, 7 separate and are brought to the start of the model route 11.

A prefabricated girder section strand 12, that may be unwound from reels (not shown), is continuously supplied to the model route 11. The strand enters between upper level and lower level segments 6, 7. Liquid polyurethane or similar material is supplied to the model route 11. By heating up the lower level segments 7 for example, the polyurethane foams, and it partially surrounds at least the girder section forming the body 21. Once the upper-level segments 6 and lower-level segments 7 diverge at the end of the model route 11, a strand of mounting devices 13 is set free which can be wound on to reels (not shown). In order to achieve a smooth release of the strand of mounting devices 13 when upper and lower-level segments 6, 7 diverge at the end of the model route 11, upper and lower-level segments 6, 7 are coated or they consist of synthetic material. The length of the model route 11 depends on the reaction time of the polyurethane.

Figure 3:
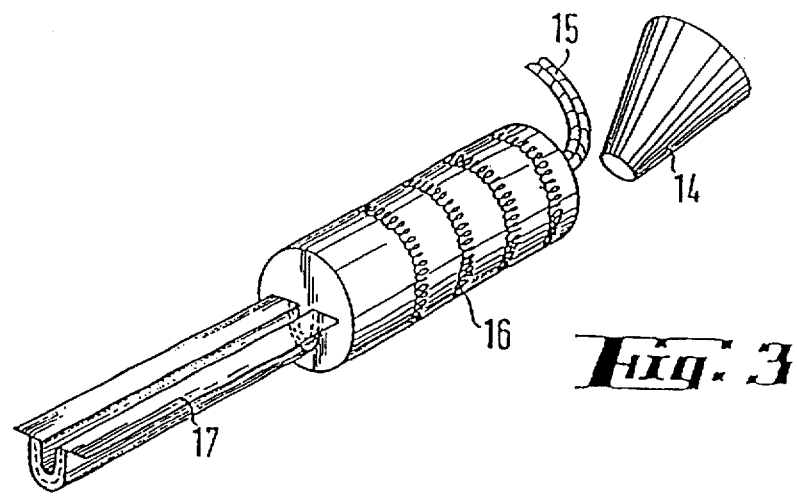
FIG. 3 is a schematic outline of a second method of producing the mounting device of the present invention.

In the second model of the invention depicted in FIG. 3, the continuous extrusion of polyurethane or the like onto a girder section strand 15 through an extrusion device 14 produces the mounting devices. By heating the polyurethane extruded through a heating device 16, a foaming of the strand occurs. The strand of mounting devices 17 which is foamed around can also be wound onto reels (not shown).

In order to facilitate the foaming in the circulating mold 5 and in the extrusion device 14 respectively, a basic girder section strand 12, 15 can be supplied to them. After the application of polyurethane and before it is hardened, the strand can be formed to the intended profile over, for example, turning reels (not shown).

Wound on to reels, the strand of mounting devices can supply the individual production site. There, the mounting devices 1 are laid into molds 18 to produce foam parts 19. Expediently, the mounting devices 1 are cut to length from the strand 13 at the production site, so that an expensive storage of the individual mounting devices is unnecessary. As a foam part 19 often needs several mounting devices 1 of different length, the cutting devices can be programmed according to the respective needs.

Figure 4:
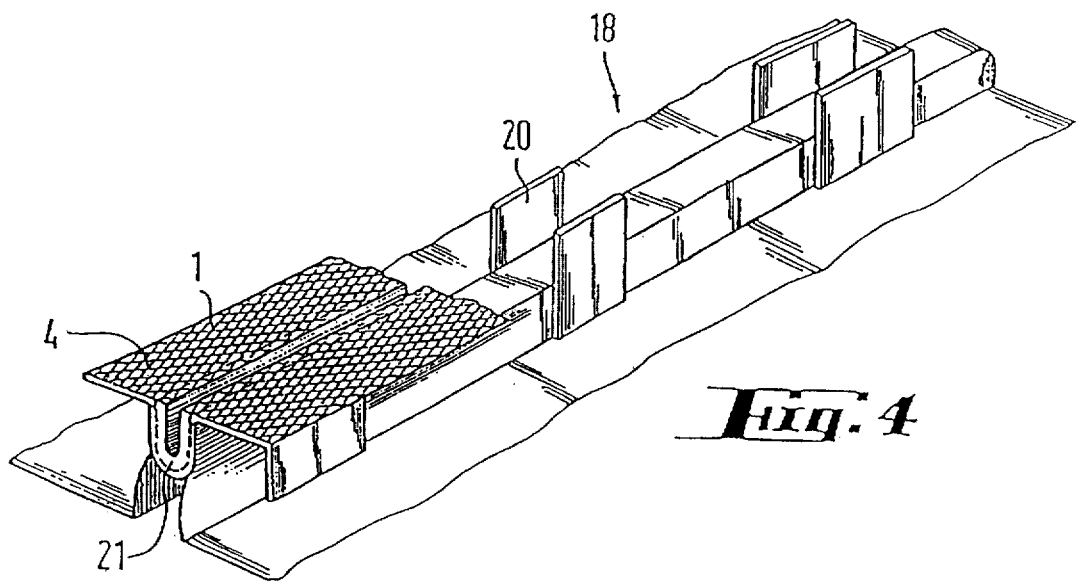
FIG. 4 is a schematic outline of a mold for creating a foam part with the mounting device of the present invention.
Figure 5:
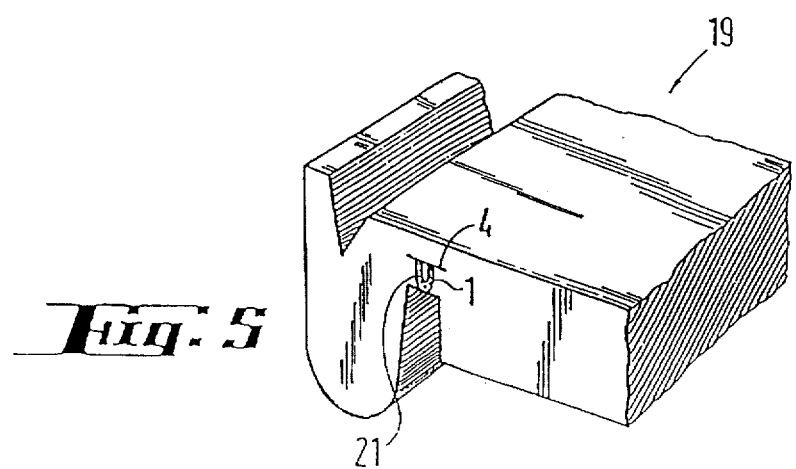
FIG. 5 is a sectional illustration of a foam part with the mounting device of the present invention.

As illustrated in FIG. 4, the mounting devices 1 are placed into holding clamps 20 which the mold 18 contains. Because of their elasticity, the mounting devices 1 easily fit into the holding clamps 20. The clamping tension will reliably hold the mounting devices 1. Once the mounting devices 1 are inserted into the mold 18, liquid polyurethane is injected into the mold 18 as usual. After the mold 18 has been closed and heated, the polyurethane foams up and completely foams the mounting devices 1. As the polyurethane of the mounting device only partially encapsulates the girder section 2 of the mounting devices 1, the foaming and encapsulating of the extending holding portions 4 only occurs once the foam part 19 foams up. Thus, the mounting devices 1 become embedded in the foam part 19. Consequently, the acceptable pull-out forces can be much higher than with the conventional inlaid wires out of metal wire. If these high pull-out forces are not needed, the additional holding portions 4 of the girder section 2 become superfluous.

Provided with such mounting devices 1, the foam part 19 is considerably lighter than foam parts which are provided with conventional inlaid wires. The foam part is recyclable as the foam pad 19 can directly be brought to a crushing machine, and it is no longer necessary to remove the mounting devices 1.

It is to be understood that the invention is not limited to the exact construction illustrated and described above, but that various changes and modifications may be made without departing from the spirit and scope of the invention as defined in the following claims.

We claim:

1. A foam part for a backrest or a seating surface of a vehicle seat comprising:

a molded foam pad 19; and an elongated mounting device 1 encapsulated within the foam pad 19, the mounting device having an elongated core 2 of a coarse meshwork and a body 21 of foamed polymer resin at least partially foamed around the core, the mounting device being encapsulated into the foam pad whereby the mounting device can be used to attach a cover onto the foam pad 19.

2. The foam part according to claim 1 wherein the core 2 is made of a material selected from the group consisting of polyethylene, jute, gauze and fleece.

3. The foam part according to claim 1 wherein the core 2 of the mounting device has a U-shaped, circular, or rectangular sectional area.

4. The foam part according to claim 1 wherein the core 2 of the mounting device has at least one holding portion 4 which extends outward from the body 21 of the mounting device and which is not foamed around by said foamed polymer resin of the mounting device but is encapsulated in the foam of the foam pad 19.

5. The foam part according to claim 1 wherein the foamed polymer resin of the body 21 which surrounds the core 2 consists at least partially of recycled material.

* * * * *